(12) United States Patent
Stluka et al.

(10) Patent No.: US 7,966,152 B2
(45) Date of Patent: Jun. 21, 2011

(54) SYSTEM, METHOD AND ALGORITHM FOR DATA-DRIVEN EQUIPMENT PERFORMANCE MONITORING

(75) Inventors: Petr Stluka, Prague (CZ); Jiri Rojicek, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 583 days.

(21) Appl. No.: 12/108,076

(22) Filed: Apr. 23, 2008

(65) Prior Publication Data

US 2009/0271150 A1  Oct. 29, 2009

(51) Int. Cl.
- G06F 11/30 (2006.01)
- G06F 11/00 (2006.01)
- G06F 19/00 (2006.01)
- G01R 27/00 (2006.01)
- G01N 37/00 (2006.01)

(52) U.S. Cl. .......... 702/182; 702/82; 702/183; 700/108; 700/276

(58) Field of Classification Search .............. 702/57–59, 702/81–84, 105, 182–184, 190–195; 700/108, 700/109, 110, 275, 276–282, 299–306; 703/2, 703/6, 13

See application file for complete search history.

(56) References Cited

U.S. PATENT DOCUMENTS

| | | | |
|---|---|---|---|
| 6,975,962 B2 * | 12/2005 | Wegerich et al. | 702/182 |
| 7,539,597 B2 * | 5/2009 | Wegerich et al. | 702/185 |
| 2004/0102924 A1 * | 5/2004 | Jarrell et al. | 702/181 |
| 2008/0052039 A1 * | 2/2008 | Miller et al. | 702/182 |
| 2008/0082299 A1 * | 4/2008 | Samardzija et al. | 702/187 |
| 2008/0183425 A1 * | 7/2008 | Hines | 702/182 |

* cited by examiner

Primary Examiner — Michael P Nghiem
Assistant Examiner — Ricky Ngon
(74) Attorney, Agent, or Firm — Jetter & Associates, P.A.

(57) ABSTRACT

A method for automatically monitoring the performance of equipment includes compiling current operating conditions associated with current conditions (PMc). A historical database including a plurality of stored operating conditions and associated stored performance measure (PM*) is searched, each stored operating condition including at least one stored sensor reading, wherein at least one similar operating condition is identified in the search using distances between the current operating conditions and the stored operating conditions. The performance measure (PM*) associated with the similar operating condition is fit to generate a regression model. The regression model is applied to the current operating condition to generate an estimate for the performance measure for the current operating condition (PMe). A difference between PMc and PMe is computed. The first difference is compared to a predetermined threshold, wherein a warning is automatically generated if the first difference has a value greater than the predetermined threshold.

19 Claims, 4 Drawing Sheets

150

```
┌─────────────────────────────────────────────────────────────┐
│  CURRENT OPERATING CONDITIONS AND A CURRENT                 │
│  PERFORMANCE MEASURE (PMc) ASSOCIATED WITH THE CURRENT      │
│  OPERATING CONDITIONS X ARE COMPILED                        │
│                          151                                │
└─────────────────────────────────────────────────────────────┘
                              │
                              ▼
┌─────────────────────────────────────────────────────────────┐
│  A HISTORICAL DATABASE COMPRISING A PLURALITY OF STORED     │
│  OPERATING CONDITIONS X* AND ASSOCIATED STORED PERFORMANCE  │
│  MEASURES (PM*) IS SEARCHED TO IDENTIFY AT LEAST ONE        │
│  SIMILAR OPERATING CONDITION Xs* BASED ON DISTANCES BETWEEN │
│  THE CURRENT OPERATING CONDITIONS X AND THE PLURALITY OF    │
│  STORED OPERATING CONDITIONS X*                             │
│                          152                                │
└─────────────────────────────────────────────────────────────┘
                              │
                              ▼
┌─────────────────────────────────────────────────────────────┐
│  THE PM* ASSOCIATED WITH THE SIMILAR OPERATING CONDITION    │
│  Xs* IS FIT TO A REGRESSION MODEL, WHEREIN THE RUN TIME (t) │
│  IS USED AS AN INDEPENDENT VARIABLE                         │
│                          153                                │
└─────────────────────────────────────────────────────────────┘
                              │
                              ▼
┌─────────────────────────────────────────────────────────────┐
│  THE REGRESSION MODEL IS APPLIED TO THE CURRENT OPERATING   │
│  CONDITIONS X (OR A SUBSET THEREOF) AND A RUN TIME (t)      │
│  ASSOCIATED WITH THE CURRENT OPERATING CONDITIONS TO        │
│  GENERATE AN ESTIMATE FOR THE PM FOR THE CURRENT OPERATING  │
│  CONDITIONS (PMe)                                           │
│                          154                                │
└─────────────────────────────────────────────────────────────┘
                              │
                              ▼
┌─────────────────────────────────────────────────────────────┐
│  THE REGRESSION MODEL IS APPLIED TO THE SIMILAR OPERATING   │
│  CONDITIONS Xs* EVALUATED AT AN INITIAL PERIOD OF OPERATION │
│  FOR THE EQUIPMENT (I.E., RELATIVE TO A CLEANING/MAINTENANCE)│
│  TO GENERATE AN IDEAL/HISTORICALLY BEST PERFORMANCE FOR THE │
│  PERFORMANCE MEASURE (PMi)                                  │
│                          155                                │
└─────────────────────────────────────────────────────────────┘
                              │
                              ▼
┌─────────────────────────────────────────────────────────────┐
│  A FIRST DIFFERENCE BETWEEN PMc AND PMi AND A SECOND        │
│  DIFFERENCE BETWEEN PMc AND PMe IS COMPUTED                 │
│                          156                                │
└─────────────────────────────────────────────────────────────┘
                              │
                              ▼
┌─────────────────────────────────────────────────────────────┐
│  AT LEAST ONE OF THE FIRST AND SECOND DIFFERENCES ARE       │
│  COMPARED TO RESPECTIVE PREDETERMINED THRESHOLDS, AND       │
│  DIFFERENT WARNINGS ARE AUTOMATICALLY GENERATED WHEN FIRST  │
│  AND SECOND DIFFERENCES ARE ABOVE THEIR RESPECTIVE          │
│  PREDETERMINED THRESHOLDS                                   │
│                          157                                │
└─────────────────────────────────────────────────────────────┘
```

FIG. 1B

SYSTEM, METHOD AND ALGORITHM FOR DATA-DRIVEN EQUIPMENT PERFORMANCE MONITORING

FIELD OF THE INVENTION

Embodiments of the present invention relate to systems, methods and algorithms for automatically monitoring the performance of equipment.

BACKGROUND

The monitoring of performance for various types of equipment, such as used in process industries or in building HVAC systems, is frequently limited. The limitations are due to many of the assets not being sufficiently instrumented by sensors for obtaining measurements, such as temperatures, pressures, flow rates, and other important performance impacting parameters. As a consequence, standard monitoring approaches that are based on first principles (e.g. an understanding of physics, mechanics and chemistry for the given equipment and/or process) cannot generally be efficiently applied because such approaches typically require a large number of sensors and intensive knowledge of the modeled system.

Typically, an important monitor function requirement involves determining whether the value of given equipment performance measure represents normal or abnormal behavior. Some equipment vendors provide rating limits for expected performance (referred to generally as reference behavior), but this is not always that case. As a result, there is a need for a new performance measure reference so that equipment performance at any given time may be judged to determine if it is normal or abnormal, such as for use in determining when to perform equipment maintenance on the equipment.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A method for automatically monitoring the performance of equipment includes the step of compiling current operating conditions including at least one current sensor reading and at least one current performance measurement associated with the current conditions (PMc). A historical database including a plurality of stored operating conditions is searched, each stored operating condition including at least one stored sensor reading and at least one associated stored performance measure (PM*), wherein at least one similar operating condition is identified in the search using distances between the current operating conditions and the plurality of stored operating conditions. The performance measure associated with the similar operating condition(s) is (are) fit to generate a regression model. The regression model is applied to the current operating conditions to generate a model estimate for the performance measure for the current operating conditions (PMe). A first difference between PMc and said PMe is computed. The first difference is compared to a predetermined threshold, wherein a warning is automatically generated if the first difference has a value greater than the predetermined threshold.

In a related method, the retrieved data points are fitted by a regression model PM=f(X,t), where t stands for time. Time (t) is thus added to the regression model as another independent variable, beyond those X1 . . . XN described in the method above (e.g. an $X_{N+1}$ variable). The regression model is applied to similar operating condition(s) evaluated at an initial period of operation for the equipment to generate an ideal performance for the performance measure (PMi). At least one of a first difference between PMc and PMi and a second difference between PMc and PMe are computed. At least one of the first and second difference is compared to respective first and second predetermined thresholds, wherein a first warning is generated if the first differences is above the first predetermined threshold and a second warning different from the first warning is generated if the second difference is above the second predetermined threshold.

A system comprising equipment having automatic monitoring for assessing the performance of the equipment comprises a plurality of sensors for reporting sensor readings and a plurality of actuators for controlling operational aspects of the equipment. The system also comprises a computing system coupled to the equipment comprising a controller, processor and software module, and memory including a stored historical database comprising a plurality of stored operating conditions and associated stored performance measures (PM*). The software module includes stored code for implementing one of the methods described above.

FIGURES

FIG. 1B is a flow chart for another exemplary method for automatically monitoring the performance of equipment, according to an embodiment of the invention.

DETAILED DESCRIPTION

Figure 1A:
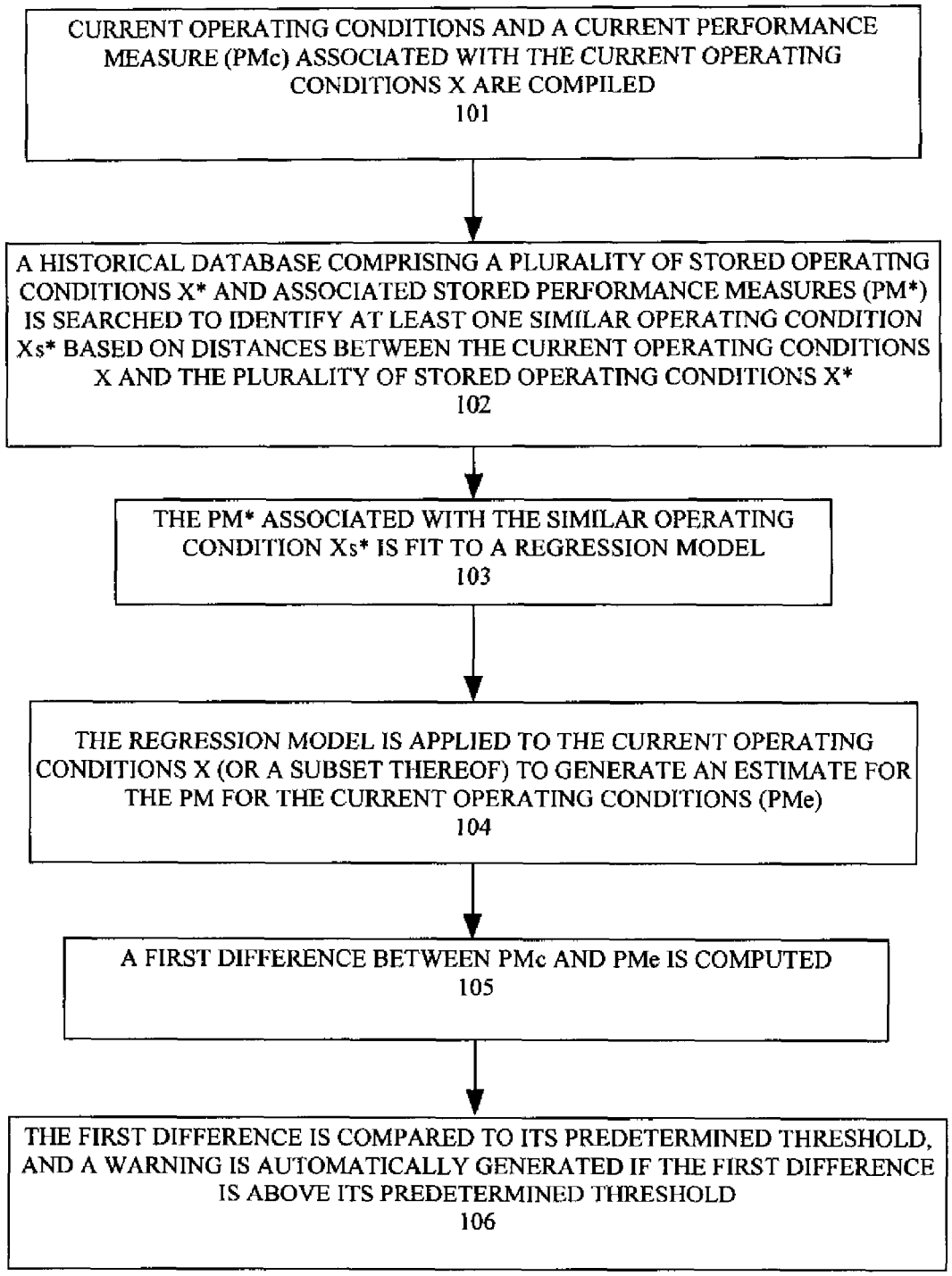
FIG. 1A is a flow chart for an exemplary method for automatically monitoring the performance of equipment, according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The invention concerns methods, algorithms, and related implementing systems that provide an automatic performance monitoring solution that leverages information stored in a historical database. Embodiments of the invention are generally applicable for less instrumented assets and can infer the reference behavior from the stored operating history for determining whether the equipment is operating normally or abnormally, which can eliminate the need for the equipment to be fully instrumented, and also can overcome problems associated with missing reference behavior. A general minimum requirement is that there are at least two variables, one indicative of equipment performance, the other representing one or more operating conditions. As defined herein, "operating conditions", whether current or stored, comprise one or more sensor readings (e.g. temperature, pressure, or flow rate) and optionally one or more control signals. Control signals are typically available in the system and thus can be used as one or more variables representing the operating conditions.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Referring to FIG. 1A, a flow chart for a method for automatically monitoring the performance of equipment 100 according to an embodiment of the invention is shown. In step 101 current operating conditions and at least one current performance measure (PMc) associated with the current operating conditions X are compiled. Operating conditions can be described by a set of variables. The set of variables can be separated into two categories, independent condition variables X describing operating conditions and dependent variables Y that change based on specific X values. Performance measures, such as PMc, can be calculated from the set of variables (X,Y) using a mathematical formula. In some implementations this formula may also include system parameters, for example, the heat exchange area of a heating coil. Alternatively, one of the Y variable(s) can be used directly as the PM.

For example, in the case of a water/air heat exchanger, the X variables can comprise the inlet temperature of the air, the control signal for the valve that regulates flow rate of the water, and the control signal for the fan that regulates flow rate of the air. The Y variable can be the outlet temperature of the air, which can be directly used as the PM.

In step 102, a historical database comprising a plurality of stored operating conditions X* and associated stored performance measures (PM*) is searched to identify at least one similar operating condition Xs* based on distances between the current operating conditions X and the plurality of stored operating conditions X*. When there are a plurality N of X variables, similar operating conditions can be searched with the similarity being defined over all N variables {X1, ..., XN}, or only over a selected subset (depending on specific implementation) of the variables. A process engineer can select the subset, or alternatively, the subset can be selected by applying automated procedures for variable selection, such as statistical stepwise regression.

In one embodiment, the similarity between the X and X* can be defined as the geometrical proximity of two operating multidimensional points, such as implemented in form of a distance function. One distance function that can be used is a Euclidean distance or Euclidean metric which is the "ordinary" distance between two points that one would measure with a ruler, which can be proven by repeated application of the Pythagorean theorem. By using this formula as distance, Euclidean space becomes a metric space (even a Hilbert space). Other distance functions can be used as well, for instance those defined by the Minkowski metrics family. For example, one definition of similarity can be based on Euclidean distance, wherein all points that satisfy the constraint indicated below can be considered similar:

$$d^2 = \sum_{i=1}^{N} \left(\frac{x_i - x_i^*}{h_i}\right)^2 \leq 1$$

All historical operating conditions X* that satisfy the above constraint can be considered similar, where $d^2$ is the squared Euclidean distance (d) between the X* (or subset thereof) and X (or subset thereof). The parameters {h1, ..., hN} in the denominator which control the number of retrieved similar X* determined to be similar, can be specified in advance, such as by the process engineer, or by applying a heuristic rule that determines a specific value of hi, for example, 5% of the range between the historical minimum and historical maximum of the condition variable Xi.

The parameter hi for i-th operating condition Xi can be identified in the following way. The historical values Xi* are searched to identify the lowest (minimum Xi,min) and highest (maximum Xi,max) value of Xi that were observed in the history. Consequently the range R can be calculated as R=Xi, max−Xi,min (difference between the maximum and minimum). Lastly, the parameter hi can be determined as a percentage, such as 5%, of the range R (then hi=0.05*R), where 5% in one embodiment is the recommended value based on the best practice (and can generally be changed).

Similar historical operating conditions Xs* are thus retrieved together with their respective historical PM*. Each retrieved vector of similar operating conditions Xs* is an operating conditions vector that satisfies the above constraint that its Euclidean distance $d^2$ from the current operating conditions X is less than a constant, such as 1 in the equation above.

In step 103, the PM* values associated with the similar operating conditions Xs* are used to build a regression model for modeling PM* in dependence on Xs*. In step 104, the regression model is applied to the current operating conditions X (or a subset thereof) to generate an estimate for PM for the current operating conditions (PMe). In step 105 a first difference between PMc and PMe is computed. In step 106, the first difference is compared to its predetermined threshold, and a warning can be automatically generated if the first difference is above its predetermined threshold.

Referring now to FIG. 1B, a flow chart for a method for automatically monitoring the performance of equipment 150 according to another embodiment of the invention is shown. Step 151 comprises compiling current operating conditions and a current performance measure (PMc) associated with the current operating conditions. In step 152, a historical database comprising a plurality of stored operating conditions X* is searched to identify at least one similar operating condition based on distances between X and X*. A performance measurement and a run time (t) which is defined herein a processing time measured relative to when the last cleaning/maintenance was performed is associated with each X*, or if information regarding the last cleaning/maintenance is not available, the time interval measured from the beginning of the operating history is used as the run time. As with method 100 described relative to FIG. 1A, when there are a plurality N of X variables, similar operating conditions can be searched with the similarity being defined over all N variables {X1, ..., XN}, or only over a selected subset (depending on specific implementation) of the variables.

In step 153, the PMs* associated with the similar operating conditions Xs* are fit to a regression model, wherein the run time is used as an independent variable. Only points from the last operating cycle (the time between two cleaning/maintenance actions) are generally considered. If the information about the operating cycles is not available, then all similar points can be retrieved. In this embodiment, the retrieved data points are fitted by a regression model PM=f(X,t), where t stands for time. Time (t) is thus added to the regression model as another independent variable, beyond those X1 . . . XN described above (e.g. an XN+1 variable). The time is generally converted to a numeric representation for processing. One standard conversion method is to express a specific time (e.g. Mar. 20, 2008 11:54) as the number of days from Jan. 1, 1900, which is 39,527.48. This is a standard approach commonly implemented in modern databases. The polynomial fit can be specified for each condition variable {X1, ..., XN} . . . this being done in advance as part of the solution setup.

Alternatively, the polynomial fits can be identified as part of the process of automated variable selection such as the statistical stepwise regression. Subset conditions X as well as respective polynomial fits can be identified either manually by a process engineer (or an individual in charge that is doing setup of the algorithm), or applying an automated process that makes a "statistically optimal choice". This process is usually implemented as statistical stepwise regression, but other methods can be used as well.

In step 154 the regression model is applied to the current operating conditions X (or a subset thereof) and a run time t associated with the current operating conditions to generate an estimate for the PM for the current operating conditions (PMe). In step 155 the regression model is applied to Xs* evaluated at an initial period of operation for the equipment (relative to a cleaning/maintenance) to generate an ideal/historically best performance for the performance measure (PMi). PMi can be used as a substitute for unavailable "reference behavior".

In step 156 a first difference between the PMc and PMi is computed. The first difference can be used to indicate long-term performance degradation, such as how the performance changed compared to a "reference behavior" (time shortly after last cleaning/maintenance). A second difference between the PMc and the PMe can also be computed. The second difference can indicate the instantaneous deviation of the current performance from the performance estimate based on historical behavior, and can be used as an indicator of short-term inconsistency, that can be caused for example by some mechanical fault.

In step 157, by comparing at least one of the first and second differences to respective predetermined thresholds, warnings can be automatically generated if at least one of the first and second differences are above their respective predetermined threshold. In embodiments of the invention the warnings for exceeding the respective predetermined thresholds are generally different warnings, each generated separately from the other. The respective warnings will provide alerts about different issues, one being "long-term degradation" (the first difference—between the PMc and PMi), and the other being "instantaneous deviation" from expected performance (the second difference—between the PMc and the PMc). The warnings can be presented to a reliability engineer or maintenance engineer and used to determine when to perform equipment maintenance or cleaning. Also long-term trends of both differences can be presented in chart form.

Figure 2:
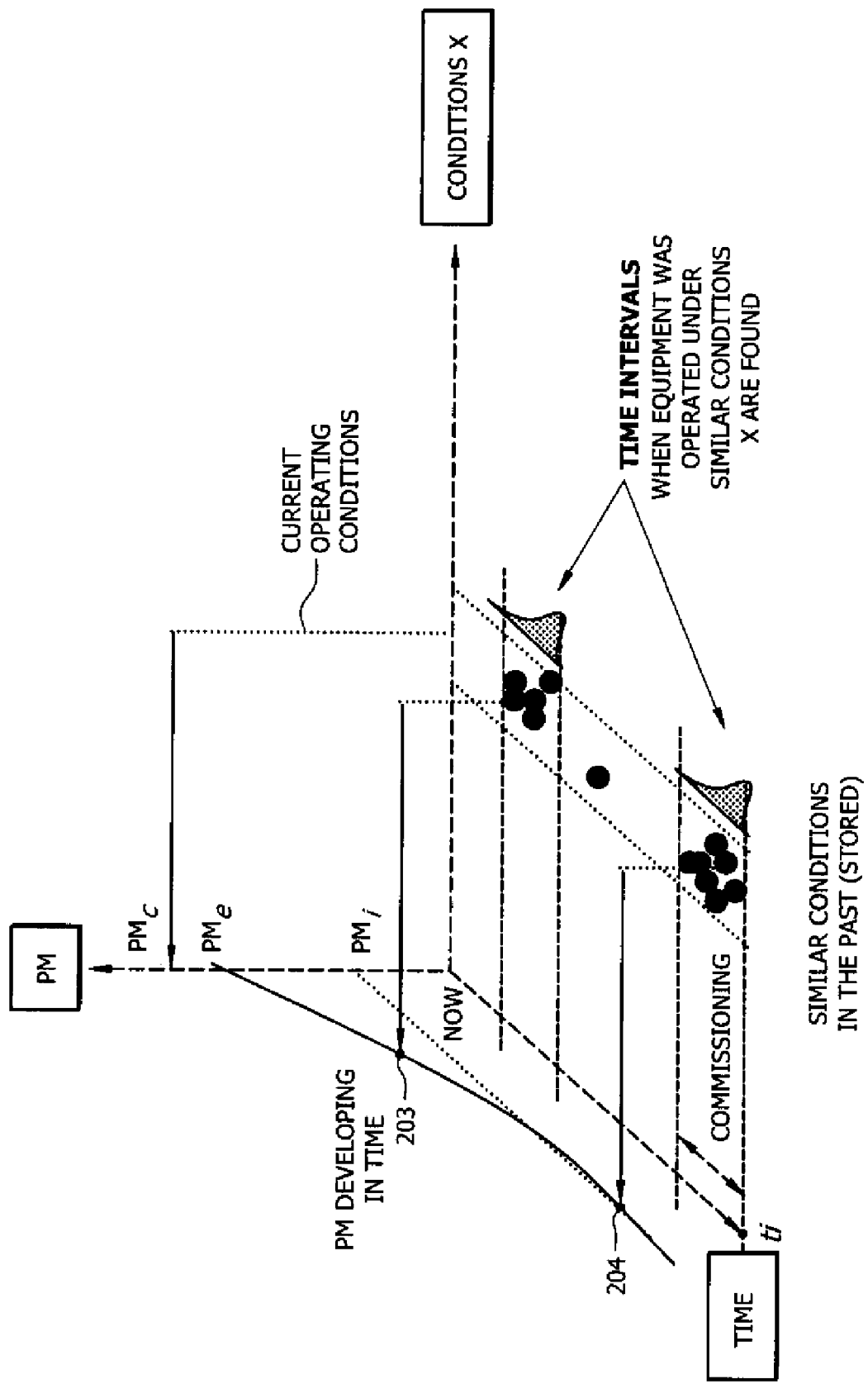
FIG. 2 is an exemplary illustration of data-driven modeling according to an embodiment of the invention based on the exemplary method described relative to FIG. 1B.

FIG. 2 is an exemplary illustration of data-driven modeling, according to an embodiment of the invention that is based on method 150 and FIG. 1B. The performance measure (PM) is plotted along the z-axis, with the operational conditions shown for simplicity as a one dimensional vector plotted along the x-axis. The run time (t) is plotted along the y-axis, where the center of coordinate system represents the actual time. Normally, the commonly used convention is that each axis (x, y, and z) begins in the center (=intersection of all axes) and the numerical values are increasing with the distance from this center. For instance, performance measure (PM) equal to 0 (minimum) is associated with the center; while values of PM are increasing in the upward direction. However, FIG. 2 contains one untypical convention that relates to the time axis (y-axis). This axis is actually oriented in opposite way, which means that the minimum time corresponds to the maximum distance from center, while the maximum time (=current time, time now) corresponds to the position exactly in the center of this coordinate system.

The curve shown is the regression model generated when the equipment was operated under similar conditions Xs* (thus having similar X values). Xs* are shown clustered around run times t1 and t2. PMi represents the ideal/historically best PM at some initial time (t=ti), typically after system commissioning. Reference 203 identifies the model's PM estimate (PMe) for actual conditions and a run time t=t1, while reference 204 identifies the model's PMe for actual conditions and a run time t=t2.

Figure 3:
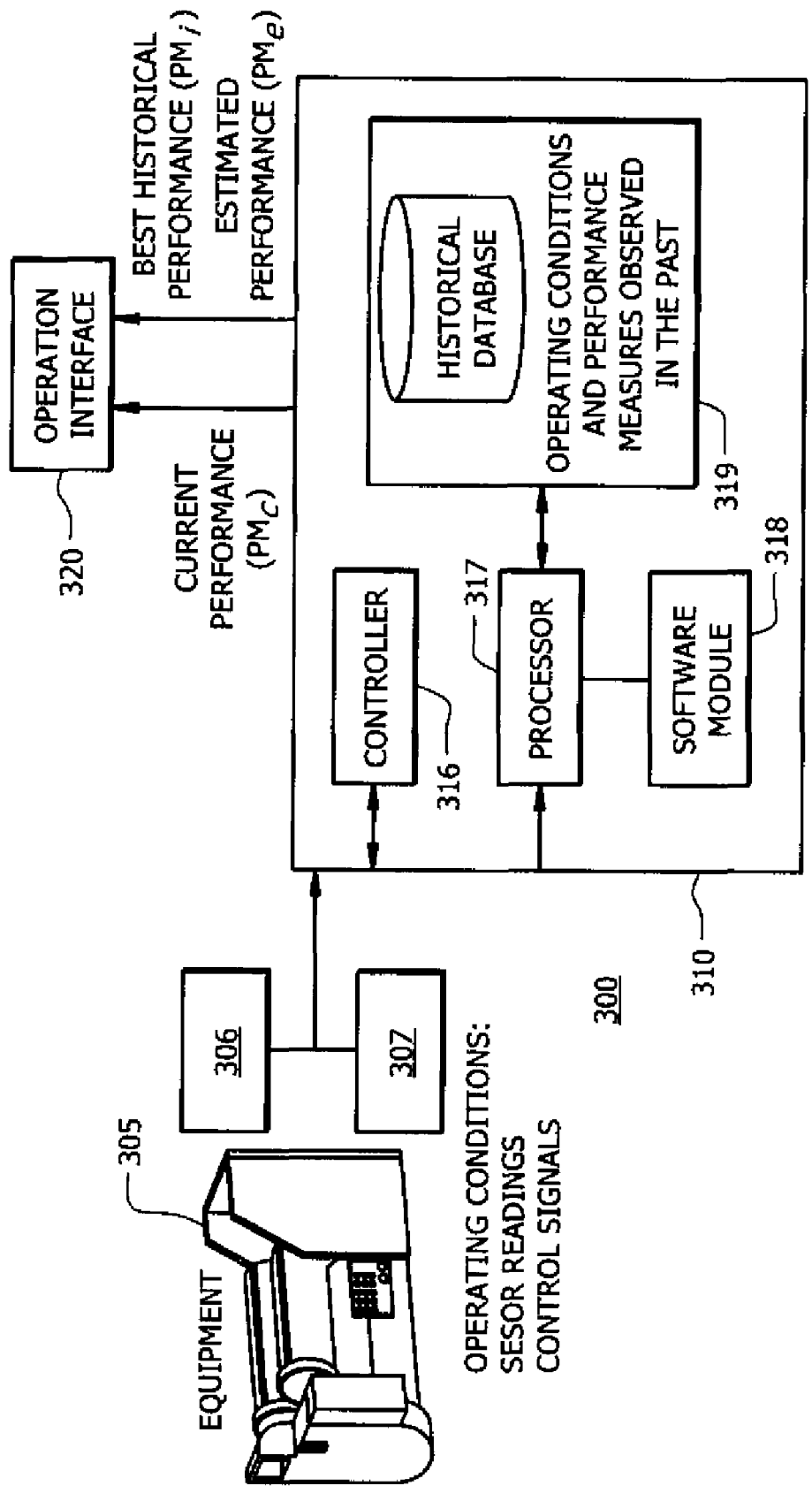
FIG. 3 is a high level representation of a system comprising a manufacturing or processing plant having a performance monitoring system according to an embodiment of the invention.

FIG. 3 is a high level representation of a system 300 comprising at least one piece of equipment 305, according to an embodiment of the invention. Equipment can comprise, for example, industrial equipment including a heat exchanger, pump, compressor, boiler, heater or reactor. Equipment 305 may also be heating ventilating and air conditioning equipment (HVAC), including one or more of air handling unit, chiller, boiler, fan, or pump. A plurality of sensors 306 are coupled to equipment 305 for reporting actual real-time values. A plurality of actuators 307 control various operational aspects of equipment 305.

Computing system 310 comprises controller 316 and processor 317. System 300 can be a distributed control system (DCS). In that embodiment, sensor 306 and actuators a smart (microprocessor-based) devices. Software module 318, which generally is loaded with algorithms according to embodiments of the invention, is coupled to processor 317. Computing system 310 also includes memory 319, which is shown including a stored historical database comprising operating conditions, and their associated PM and run time. Processor 317 receives sensor readings and control signals and determines the PM measure from the sensor readings and/or control signals which is stored in memory 319. Operator interface 320 is coupled to the computing system 310 which is operable for viewing charts and graphs, and receiving alarm messages. In operation, the algorithm run by processor 317 searches the historical database for similar operating conditions X* relative to current operating conditions X and can perform the other steps described above relative to FIGS. 1A and 1B.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

In light of the forgoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also generally be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for automatically monitoring the performance of equipment, comprising the steps of:
    compiling current operating conditions of said equipment comprising at least one current sensor reading and at least one current performance measurement (PMc) associated with said current operating conditions;
    searching, using a computing system including non-transitory machine readable storage, a historical database comprising a plurality of stored operating conditions and at least one associated stored performance measure (PM*) that are stored in the non-transitory machine readable storage, each said stored operating conditions comprising at least one stored sensor reading wherein at least one similar operating condition is identified using distances between said current operating conditions and said plurality of stored operating conditions;
    fitting said stored performance measure (PM*) associated with said similar operating condition to generate a regression model;
    applying said regression model to said current operating conditions to generate an estimate for said performance measure for said current operating conditions (PMe);
    computing a first difference between said PMc and said PMe, and
    comparing said first difference to a predetermined threshold, wherein a warning is automatically generated if said first difference has a value greater than said predetermined threshold.

2. The method of claim 1, wherein said stored operating conditions comprise respective run times, further wherein said run times are used as an independent variable in said fitting step, and said applying said regression model further includes a time associated with said current operating conditions.

3. The method of claim 1, further comprising the step of applying said regression model to said similar operating condition evaluated at an initial period of operation for said equipment to generate an ideal performance for said performance measure (PMi);
    said computing further comprises a second difference between said PMc and said PMi, and said comparing comprises comparing at least one of said first and second difference to respective predetermined thresholds, wherein a first warning is generated if said first difference is above said first predetermined threshold and a second warning different from said first warning is generated if said second difference is above said second predetermined threshold.

4. The method of claim 3, wherein both said first difference and said second difference are calculated in said calculating and compared in said comparing step.

5. The method of claim 1, wherein said current operating conditions further comprises at least one current control signal and said stored operating conditions each further comprise at least one stored control signal.

6. The method of claim 1, wherein said equipment comprises industrial processing equipment.

7. The method of claim 1, wherein said equipment comprises building HVAC equipment.

8. The method of claim 1, wherein said distances are based on Euclidean distances.

9. The method of claim 1, wherein said searching comprises searching over a selected subset of said operating conditions.

10. The method of claim 1, wherein said sensor reading comprises at least one of temperature, pressure and flow rate.

11. The method of claim 1, wherein said PMc and said PMs are calculated from said operating conditions using a formula.

12. The method of claim 1, wherein said PMc and said PMs are obtained from one of said operating conditions.

13. The method of claim 1, further comprising the step of using said warning to determined when to perform maintenance or cleaning on said equipment.

14. A method for automatically monitoring the performance of equipment, comprising the steps of:
compiling current operating conditions of said equipment comprising at least one current sensor reading and at least one current performance measurement (PMc) associated with said current operating conditions;
searching, using a computing system including non-transitory machine readable storage, a historical database comprising a plurality of stored operating conditions and at least one stored associated performance measurement (PM*) associated therewith that are stored in the non-transitory machine readable storage, each of said stored operating conditions comprising at least one stored sensor reading and a run time, wherein at least one similar operating condition is identified using distances between said current operating conditions and said plurality of stored operating conditions;
fitting said stored performance measurement (PM*) associated with said similar operating condition to generate a regression model, wherein said run time is an independent variable;
applying said regression model to said current operating conditions and a time associated with said current operating conditions to generate an estimate for said stored performance measurement for said current operating conditions (PMe);
applying said regression model to said similar operating condition evaluated at an initial period of operation for said equipment to generate an ideal performance for said stored performance measurement (PMi);
computing at least one of a first difference between said PMc and said PMi and a second difference between said PMc and said PMe, and
comparing at least one of said first and second difference to respective first and second predetermined thresholds, wherein a first warning is generated if said first differences is above said first predetermined threshold and a second warning different from said first warning is generated if said second difference is above said second predetermined threshold.

15. The method of claim 14, wherein said current operating conditions further comprises at least one current control signal and said stored operating conditions each further comprise at least one stored control signal.

16. A non-transitory machine readable storage for automatically monitoring and assessing the performance of equipment having an associated computing system including a historical database comprising a plurality of stored operating conditions each comprising at least one associated stored performance measure (PM*), said non-transitory machine readable storage having stored thereon a computer program, the non-transitory machine readable storage comprising:
code for searching said historical database, wherein at least one similar operating condition is identified using distances between a current operating condition comprising at least one current sensor reading and at least one current performance measurement associated with said current conditions (PMc) and said plurality of stored operating conditions;
code for fitting said stored performance measure (PM*) associated with said similar operating condition to generate a regression model;
code for applying said regression model to said current operating conditions to generate an estimate for said performance measure for said current operating conditions (PMe);
code for computing a first difference between said PMc and said PMe, and
code for comparing said first difference to a predetermined threshold, wherein a warning is generated if said first difference is above said respective predetermined threshold.

17. A system comprising equipment having automatic monitoring for assessing the performance of said equipment, comprising:
a plurality of sensors for reporting sensor readings and a plurality of actuators for controlling operational aspects of said equipment;
a computing system coupled to said equipment comprising a controller, processor and software module, and memory including a stored historical database comprising a plurality of stored operating conditions and associated stored performance measures (PM*); wherein said software module includes:
code for compiling current operating conditions comprising at least one current sensor reading and at least one current control signal, and at least one current performance measurement associated with said current operating conditions (PMc);
code for searching said historical database comprising said plurality of stored operating conditions and identifying at least one similar operating condition using distances between said current operating conditions and said plurality of stored operating conditions;
code for fitting said stored performance measure (PM*) associated with said similar operating condition to generate a regression model;
code for applying said regression model to said current operating conditions to generate an estimate for said performance measure for said current operating conditions (PMe);
code for computing a first difference said PMc and said PMe, and
code for comparing said first difference to a predetermined threshold, wherein warnings are generated if said first difference is above said predetermined threshold.

18. The system of claim 17, wherein said equipment comprises industrial processing equipment.

19. The system of claim 17, wherein said equipment comprises building HVAC equipment.

* * * * *